J. G. MACLAREN.
CARRIER DISTRIBUTER.
APPLICATION FILED AUG. 27, 1917.

1,323,708.

Patented Dec. 2, 1919.
3 SHEETS—SHEET 1.

Inventor:
James G. Maclaren.

J. G. MACLAREN.
CARRIER DISTRIBUTER.
APPLICATION FILED AUG. 27, 1917.

1,323,708.

Patented Dec. 2, 1919.
3 SHEETS—SHEET 2.

Inventor:
James G. Maclaren,
by Emery, Booth, Janney & Varney
Attys.

J. G. MACLAREN.
CARRIER DISTRIBUTER.
APPLICATION FILED AUG. 27, 1917.
1,323,708.
Patented Dec. 2, 1919.
3 SHEETS—SHEET 3.
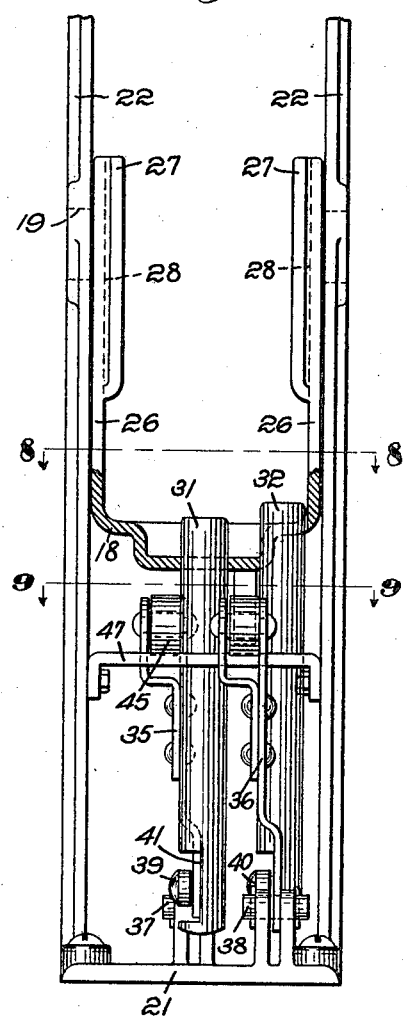
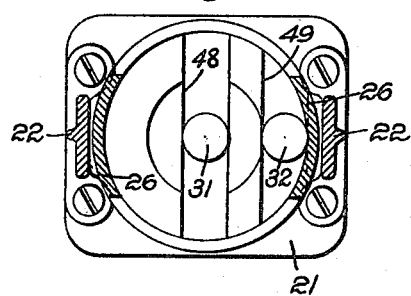
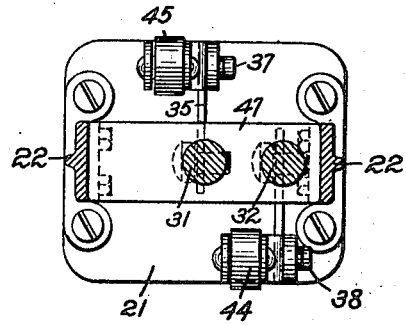
Inventor:
James G. Maclaren,
by Emery, Booth, Janney & Varney,
Attys.

UNITED STATES PATENT OFFICE.

JAMES G. MACLAREN, OF MAMARONECK, NEW YORK.

CARRIER-DISTRIBUTER.

1,323,708.          Specification of Letters Patent.          Patented Dec. 2, 1919.

Application filed August 27, 1917. Serial No. 188,308.

*To all whom it may concern:*

Be it known that I, JAMES G. MACLAREN, a citizen of the United States, and resident of Mamaroneck, Westchester county, New York, have invented an Improvement in Carrier-Distributers, of which the following description, in connection with the accompanying drawings, is a specification, like characters on the drawings representing like parts.

This invention relates to carrier distributers, and is intended to be used in connection with carrier systems for the distribution or separation of carriers, according to different classes to which they belong. My invention is more especially, though not exclusively, concerned with a carrier distributer of this class intended for use in connection with a pneumatic despatch system in which carriers of more than one class are transmitted through a common transit tube to the distributer, where they are distributed according to their classes by selecting means adapted for coöperation with carriers differing from one another in form, dimension or other characteristic, which determines their class.

My invention will be best understood by reference to the following description when taken in connection with the accompanying drawings showing two specific embodiments thereof, while its scope will be more particularly pointed out in the appended claims.

In the drawings:

Fig. 7 is a detail side elevation, partly in vertical section, of a modification of the carrier distributer;

Fig. 8 is a plan section on line 8—8 of Fig. 7; and

Fig. 9 is a plan section on line 9—9 of Fig. 7.

Figure 1:
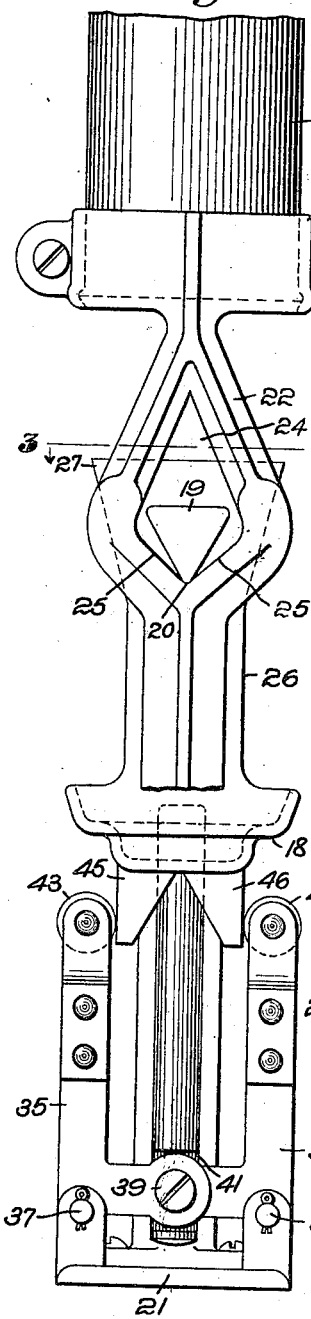
Figure 1 is a front elevation of one form of carrier distributer embodying my invention, showing the parts in the position which they normally occupy.

Referring to the drawings, and to the embodiment of my invention which I have selected for illustration, I have there shown a portion of a carrier apparatus having carrier-transmission means 10, which may be and herein is a transit tube of a pneumatic despatch tube system, the terminal of said tube having a delivery orifice 11, through which carriers of two classes 12 and 13 are delivered. The carriers of these two classes may differ from each other in form, dimension or other suitable characteristic, adapted for coöperation with the selecting means by which the carriers of one class are separated from those of the other class. In the present example, each carrier 12 of one class is provided with heads or buffers 14, which may be provided with recesses 15, while the carriers 13 of the other class are herein provided with heads or buffers 16, having projecting plugs 17.

Each carrier when it is discharged from the transit tube is delivered into a receiver 18, which is preferably normally maintained in carrier-receiving position solely by gravity, said receiver to this end being provided with trunnions 19, by means of which the receiver is fulcrumed above its center of gravity when empty, and is thus normally maintained in carrier-receiving position. These trunnions may take various forms, and may be otherwise suitably supported, but in the present example, in order to insure the greatest sensitiveness and to eliminate the friction which would be caused by ordinary journal bearings, I have made the trunnions of knife-edge form similar to those of a scale beam, as best shown in Fig. 1. The edge forming the fulcrum of each trunnion is mounted in a V-shaped groove 20 in a suitable support, the latter herein comprising a frame having a base 21 and a pair of uprights 22, connecting said base with a clamping collar 23, the latter encircling and being clamped about the transit tube 10. These uprights are preferably provided with apertures 24 to receive the trunnions 19, and as a means for limiting the lateral swinging movement of the receiver, each aperture 24 is so formed as to provide two abutments 25, constituting stops to be engaged by the corresponding faces of the angular trunnion, as best seen in Fig. 1.

As distinguished from the pivoted carrier receivers of other distributers used heretofore, the receiver 18 is open-sided, so that by rocking the same slightly in one direction, it may cause the carrier to topple over in the opposite direction and be ejected. To this end, the receiver 18 is preferably in the form of a shallow cup, having a pair of arms 26 on which the trunnions 19 are formed, thus providing at opposite sides of the receiver lateral openings through which the carrier may be discharged.

Figure 3:
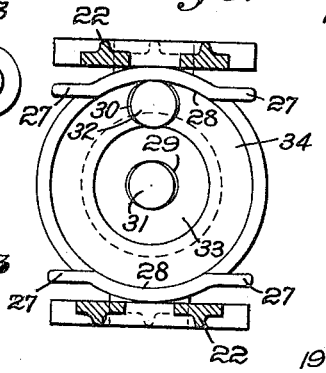
Fig. 3 is a detail plan section on line 3—3 of Fig. 1.
Figure 4:
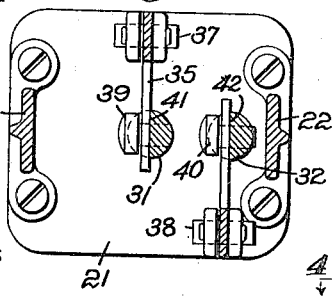
Fig. 4 is a detail plan section on line 4—4 of Fig. 2.

It may happen that while the receiver is tilted laterally, during the discharge of one carrier, a succeeding carrier may follow the first so closely as to interfere with the proper working of the distributer, unless some special provision be made to prevent the entrance of the succeeding carrier into the receiver until the latter has returned to its normal position. To this end, I have herein provided each of the arms 26 with two pairs of laterally projecting abutments 27, best shown in Fig. 3, constituting stops which, when swung into the path of the succeeding carrier, arrest the latter and prevent it from entering into the receiver until, after the previous carrier has been discharged, the receiver is restored to its normal, upright position.

Figure 2:
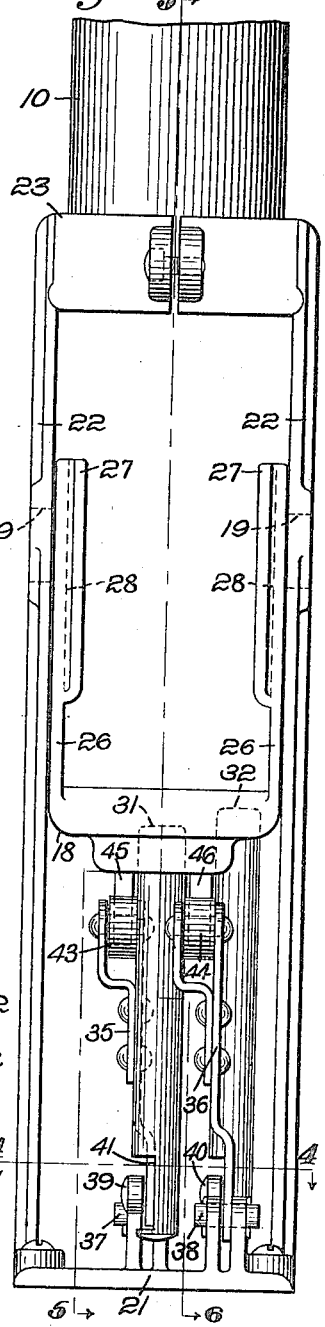
Fig. 2 is a side elevation of the same.

It should here be noted that the head or buffer of each carrier is somewhat larger in diameter than the body of the carrier. The abutments 27 are spaced apart, as best shown in Fig. 2, a sufficient distance to allow the body of the carrier to pass therebetween, and, as viewed in plan in Fig. 3, each abutment is provided with a concave recess 28 formed on an arc of a circle somewhat larger in diameter than the head or buffer of the carrier. This being so, it must be evident that when the receiver is in its normal upright position, a carrier discharged from the transit tube 10 will pass freely into the receiver and, when afterward the latter is rocked laterally, the carrier will topple over, its body passing through the space provided between the abutments 27. It is evident that when the receiver is thus tilted, the arc-shaped recesses 28 will no longer be co-axial with reference to the transit tube, but that one pair of abutments or the other, as the case may be, is brought into the path of the succeeding carrier, thus arresting the latter until the receiver once more occupies its normal position.

As distinguished from carrier distributers of this class heretofore, the receiver, instead of being normally locked in its carrier-receiving position, is freely movable laterally, and is normally maintained in such position solely by gravity. Furthermore, the actuating mechanism, as will presently appear, is mounted on the fixed framework, and is connected to the receiver in such a way that parts of the mechanism utilize the force of gravity to restore the receiver to its normal position. I am thus enabled to eliminate the springs, locking devices and other complex constructions which characterize carrier distributers of this general type heretofore used. To these ends, I have herein provided the selective actuating mechanism which I will now describe.

Projecting through apertures 29 and 30 in the bottom of the receiver 18 are abutments 31 and 32, respectively, in the form of plungers, one of which is adapted to be depressed by the impact of the carriers of one class, and the other by the carriers of the other class. To this end, the plunger 31 is herein relatively short, and coaxially arranged with relation to the receiver and the carrier, projecting upward into a central depression 33 in the bottom of the receiver 18, while the plunger 32 is relatively long and projects upward into a main recess 34 at one side of the recess 33.

When a carrier 12 of one class enters the receiver, the annular end of its head or buffer 14 strikes and depresses the plunger 32, while the plunger 31, being in the depression 33 below the level of the main recess 34 is unaffected by the impact of such carrier. When, however, a carrier 13 of the other class enters the receiver, its projecting plug 17 will strike the plunger 31 and enter the depression 33, thus depressing said plunger without affecting the plunger 32.

The plungers are connected each to the receiver by suitable means, so that when one plunger is depressed, the receiver will be swung sharply in one direction, and when the other plunger is depressed, the receiver will be swung in the opposite direction, thereby causing the carrier to topple out of the receiver in one direction or the other as the case may be, according to its class. To this end, I have herein provided two bell-crank levers 35 and 36, suitably connected to the plungers and to the receiver. The lever 35 is fulcrumed on a pivot 37 on the base 21, while the lever 36 is fulcrumed on a pivot 38 on said base. The short horizontally extending arm of the lever 35 is pivotally connected to the plunger 31 by a stud 39, while the corresponding arm of the lever 36 is connected to the plunger 32 by a stud 40. In the present example, the plungers 31 and 32 are cylindrical, and are herein slabbed or recessed to provide flat faces 41 and 42 to form bearing surfaces for the respective levers.

Figure 5:
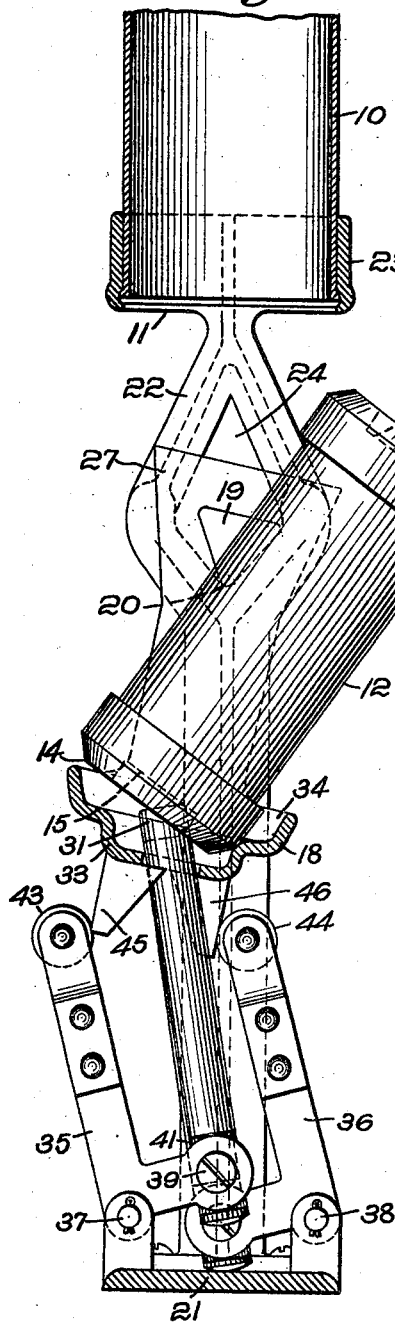
Fig. 5 is a sectional view on line 5—5 of Fig. 2, showing the parts in the position which they occupy when a carrier of one class is being ejected in one direction.

The longer upstanding arms of the levers 35 and 36 are herein provided with rollers 43 and 44, respectively, journaled thereon and engaging depending lugs 45 and 46 on the under side of the receiver 18. When, therefore, the long plunger 32 is struck and depressed by a carrier 12 of one class, said plunger rocks its lever 36 to the position shown in Fig. 5, and said lever acting against the lug 46 swings the receiver in the same direction (toward the left in Fig. 5), thus causing the carrier to topple out in the opposite direction (toward the right in Fig. 5). During this movement, the lug 45 will naturally swing the lever 35 in the same direction as the other lever, and after the carrier has started to topple over, the plunger 31 will be brought up against the bottom of the carrier with a sharp blow, thereby assisting in the ejection of the carrier.

Figure 6:
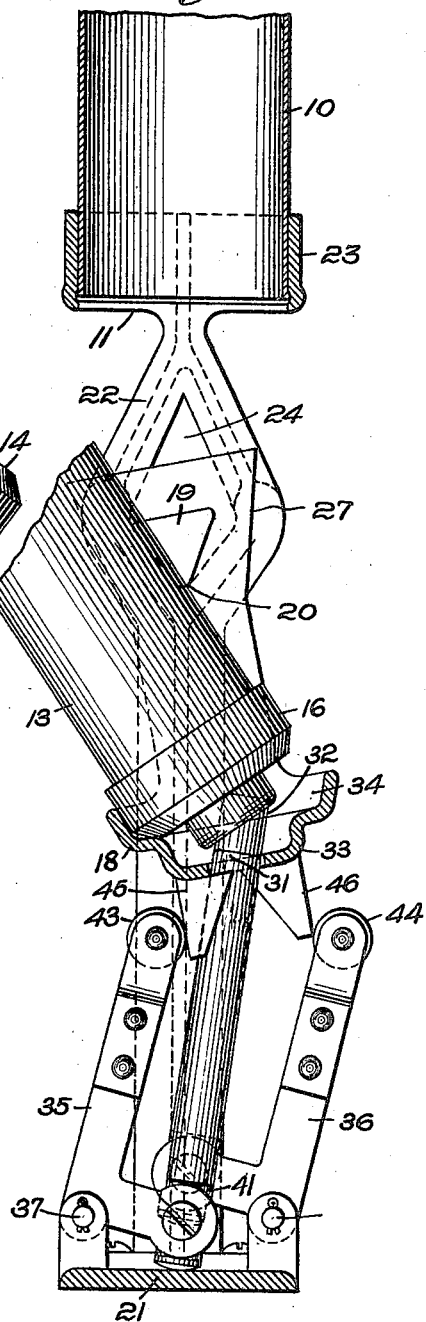
Fig. 6 is a sectional view similar to Fig. 5, but showing the parts in the position which they occupy when a carrier of another class is being ejected in the opposite direction.

When, on the other hand, the carrier 13 of the other class enters the receiver, its projecting plug 17 will strike the short plunger 31, thus depressing said plunger and causing the latter to rock its lever 35 in one direction (toward the right in Fig. 6), thereby swinging the receiver sharply in the same direction, and causing the carrier to topple over in the opposite direction (toward the left in Fig. 6). In the meantime, the lug 46, engaging the roller 44, swings the lever 36 in the same direction as the lever 35, and the lever 36 lifts the long plunger 32. Thus, toward the end of the swinging movement, the plunger 32 strikes the lower end of the carrier a sharp blow, thus assisting in the ejection of the carrier from the receiver.

In either event, as soon as the carrier is ejected, the weight of the receiver, assisted by the weight of the plungers, restores the receiver to its normal position in readiness to receive another carrier. This is accomplished by the action of gravity alone, and without the use of springs, latches, or other undesirable features.

Referring to Figs. 7, 8 and 9, I have there shown a slight modification of the distributer which, in all respects, is or may be identical with that hereinbefore described, except that the plungers extend through and are guided vertically in a fixed guide 47, while the receiver is provided with elongated slots 48 and 49, to permit free lateral movement of the receiver with reference to the plungers which have no swinging movement in this case.

While I have herein shown and described two specific forms or embodiments of my invention for illustrative purposes, and have disclosed and discussed in detail the construction and arrangement incidental to two specific applications thereof, it is to be understood that the invention is limited neither to the mere details or relative arrangements of parts, nor to the specific embodiments herein shown, but that extensive deviations from the illustrated forms of embodiments of the invention may be made, without departing from the principles thereof.

Having thus described my invention, what I claim and desire by Letters Patent to secure is:

1. In a distributer for carriers, the combination of a carrier receiver normally maintained in carrier-receiving position solely by gravity, and means distinct from said receiver and actuated by the incoming carrier to move said receiver to cause the ejection of the carrier therefrom.

2. In a distributer for carriers, the combination of a carrier receiver, pivotal means swingingly to support said receiver and cause the same normally to be maintained solely by gravity in carrier-receiving position, and means distinct from said receiver and actuated by the incoming carrier to move said receiver to cause the ejection of the carrier therefrom.

3. In a distributer for carriers, the combination of a carrier receiver, means yieldingly to hold the same in carrier-receiving position, and means distinct from said receiver and actuated by the incoming carrier to move said receiver to cause the ejection of the carrier therefrom.

4. In a distributer for carriers, the combination of a carrier receiver, means to support the same in carrier-receiving position while permitting free lateral movement, and means distinct from said receiver and actuated by the incoming carrier to move said receiver to cause the ejection of the carrier therefrom.

5. In a distributer for carriers, the combination of a tilting carrier receiver normally maintained in carrier-receiving position solely by gravity, and means distinct from said receiver and actuated by the incoming carrier to tilt said receiver to cause the ejection of the carrier therefrom.

6. In a distributer for carriers, the combination with a carrier of a normally upright carrier receiver fulcrumed above its center of gravity when empty and when said carrier is received therein and normally maintained in carrier-receiving position solely by gravity, and means actuated by the impact of the incoming carrier to tilt said receiver to cause the ejection of the carrier therefrom.

7. In a distributer for carriers, the combination of an open-sided movable carrier-receiver, and means actuated by the incoming carrier to move said receiver laterally to cause lateral displacement of the carrier therefrom through the side or sides thereof by engagement with the inner end of said carrier.

8. In a distributer for carriers, the combination of an open-sided tiltable carrier-receiver, and means actuated by the incoming carrier to tilt said receiver laterally in one direction to cause the lateral displacement of the carrier therefrom in the opposite direction through the side or sides thereof by engagement with the inner end of said carrier.

9. In a distributer for carriers, the combination of an open-sided laterally movable carrier-receiver, means actuated by an incoming carrier of one class to move said receiver laterally in one direction to cause the ejection of the carrier laterally therefrom in another direction through the open side or sides of said carrier receiver by engagement with the inner end of said carrier, and means actuated by an incoming carrier of another class to move said receiver laterally in such other direction to cause the ejection of the carrier laterally therefrom in the first-mentioned direction through the open side or sides of said carrier receiver by engagement with the inner end of said carrier.

10. In a carrier distributer, the combination of a support, a tiltable carrier-receiver mounted on said support, and means mounted on said support and actuated by an incoming carier to tilt said carrier-receiver to cause the ejection of said carrier therefrom.

11. In a carrier distributer, the combination of a support, a tiltable carrier-receiver mounted on said support, and means including a lever fulcrumed on said support and actuated by an incoming carrier to tilt said carrier-receiver to cause the ejection of said carrier therefrom.

12. In a carrier distributer, the combination of a support, an open-sided tiltable carrier-receiver mounted on said support, means including a lever fulcrumed on said support and actuated by an incoming carrier of one class to tilt said carrier-receiver in one direction to cause the ejection of such carrier therefrom in the opposite direction through the open side or sides of said carrier receivers by engagement with the inner end of said carrier, and means including another lever fulcrumed on said support and actuated by an incoming carrier of another class to tilt said carrier-receiver in said opposite direction to cause the ejection of such carrier therefrom in the first-mentioned direction through the open side or sides of said carrier receivers by engagement with the inner end of said carrier.

13. In a carrier distributer, the combination of a support, a tiltable carrier-receiver mounted on said support, and means including a lever fulcrumed on said support and a plunger connected to said lever and actuated by an incoming carrier to tilt said carrier-receiver to cause the ejection of said carrier therefrom.

14. In a carrier distributer, the combination of a support, a tiltable carrier-receiver mounted on said support, means including a lever fulcrumed on said support and a plunger connected to said lever and actuated by an incoming carrier of one class to tilt said carrier-receiver to cause the ejection of such carrier therefrom in one direction, and means including another lever fulcrumed on said support and a plunger connected to said lever and actuated by an incoming carrier of another class to tilt said carrier-receiver to cause the ejection of such carrier in the opposite direction.

15. In a distributer for carriers of two classes, the combination of a tiltable open-sided carrier-receiver, a support on which said carrier-receiver is fulcrumed above its center of gravity when empty, a pair of plungers each adapted to receive the impact of a carrier of one class differing from a carrier of the other class, and a pair of levers connecting said plungers respectively to said receiver to tilt the latter in one direction or the other to cause the carrier to topple over in one direction or the other according to the class to which the carrier belongs and discharged through the open side or sides of said carrier receiver in a direction opposite to the movement of said carrier receiver.

16. In a distributer for carriers of two classes, the combination of a tiltable open-sided carrier-receiver, a support on which said carrier-receiver is fulcrumed above its center of gravity when empty, a pair of plungers each adapted to receive the impact of a carrier of one class differing from a carrier of the other class, and a pair of oppositely facing bell-crank levers connecting said plungers respectively to said receiver to tilt the latter in one direction or the other to cause the carrier to topple over in one direction or the other according to the class to which the carrier belongs and discharged through the open side or sides of said carrier receiver in a direction opposite to the movement of said carrier receiver.

17. In a distributer for carriers of two classes, the combination of a tiltable open-sided carrier-receiver having an apertured bottom, a support on which said receiver is fulcrumed above its center of gravity when empty, a pair of plungers projecting upward through the bottom of said receiver and each adapted to receive the impact of a carrier of one class differing from a carrier of the other class, and a pair of oppositely facing bell-crank levers fulcrumed on said support and connecting said plungers, respectively to said receiver to tilt the latter in one direction or the other to cause the carrier to topple over in one direction or the other according to the class to which it belongs.

In testimony whereof, I have signed my name to this specification.

JAMES G. MACLAREN.